(12) United States Patent
Grant

(10) Patent No.: US 9,398,773 B1
(45) Date of Patent: Jul. 26, 2016

(54) UNLOADER PADDLES AND POULTRY PROCESSING EQUIPMENT INCORPORATING SAME

(71) Applicant: Morris & Associates, Inc., Garner, NC (US)

(72) Inventor: Russell T. Grant, Cary, NC (US)

(73) Assignee: Morris & Associates, Inc., Garner, NC (US)

( * ) Notice: Subject to any disclaimer, the term of this patent is extended or adjusted under 35 U.S.C. 154(b) by 0 days.

(21) Appl. No.: 14/838,927

(22) Filed: Aug. 28, 2015

(51) Int. Cl.
*A22C 21/00* (2006.01)

(52) U.S. Cl.
CPC .................................. *A22C 21/0053* (2013.01)

(58) Field of Classification Search
CPC . A22C 21/0007; A22C 21/0053; A22B 7/001
USPC .......... 452/134, 135, 141, 198, 183; 426/281, 426/302, 320, 335, 438, 509–511, 520–524, 426/532, 652, 644, 646
See application file for complete search history.

(56) References Cited

U.S. PATENT DOCUMENTS

| 5,775,986 A * | 7/1998 | Law ....................... A22C 9/005 366/294 |
| 6,129,626 A * | 10/2000 | Morris, Jr. ............ A47J 43/284 452/134 |
| 7,470,173 B2 * | 12/2008 | Morris, III ......... A22C 21/0061 452/173 |

* cited by examiner

*Primary Examiner* — Richard Price, Jr.
(74) *Attorney, Agent, or Firm* — Myers Bigel & Sibley

(57) ABSTRACT

An unloader paddle for use with a poultry processing device includes an elongated arm having opposite proximal and distal ends. The elongated arm proximal end is configured to be attached to a rotatable hub and a blade is secured to the elongated arm distal end. The paddle blade includes a face, a first edge portion, a second edge portion, and a third convexly curved edge portion. The second and third edge portions of the blade extend from the first edge portion and converge to form a tip region, and the tip region is angled or bent in a direction that is transverse to the face of the blade. The blade is secured to the elongated arm distal end such that the face is oriented transverse to a longitudinal direction of the elongated arm.

28 Claims, 7 Drawing Sheets

UNLOADER PADDLES AND POULTRY PROCESSING EQUIPMENT INCORPORATING SAME

FIELD OF THE INVENTION

The present invention relates generally to poultry processing and, more particularly, to poultry processing apparatus.

BACKGROUND

Rotary unloaders, sometimes called "windmill" unloaders, are used to remove chilled carcasses from poultry chillers. FIG. 1 illustrates a conventional chiller 10 that has an open top, semi-circular tank 12 capable of holding water up to the level 14. An auger 16 that is rotatable about its axial shaft 18 is configured to urge dressed poultry carcasses 22, (also referred as "birds") from an entry end toward an unloader 20. The unloader 20 is configured to lift the birds 22 from the water and discharge them for packing or further processing, for example into a post chill decontamination tank apparatus.

A post chill decontamination tank apparatus 24 is illustrated in FIG. 2 and includes a tank 25 having an upright entrance wall 26, an opposing upright exit wall 28, and a curved perimeter wall 30 that extends between the entrance wall 26 and the exit wall 28. The walls of the tank 25 define a paddle chamber 33 with an upwardly positioned opening 32 that is formed in the upper perimeter of the tank 25. A paddle assembly 34 is positioned in the tank 25.

The illustrated paddle assembly 34 is structurally and functionally similar to the unloader 20 and includes a hub 36 positioned at a central axis 37 within the paddle chamber 33 of the tank 25. A plurality of arms 38 radiate outwardly from the hub 36 and a flat plate or paddle 42 is fixed to the end of each arm 38 (only one paddle 42 is illustrated in FIG. 2). The paddles 42 are configured to gather birds 22 submerged in the water of the tank 25 and bring them to the top of the tank 25 for discharge through the opening 32. As the hub 36 rotates, the paddles 42 lift the birds 22 submerged in the water within the tank 25.

When a conventional unloader paddle, such as paddle 42 illustrated in FIG. 2, is rotating through the lower portion of the tank 25, the paddle 42 forms an irregular triangular pyramidal space or pocket with the end wall 28 and side wall 30 of the tank 25. The base of the pyramid is defined by a plane roughly perpendicular to the paddle and containing a gathering edge 43 of the paddle 42. Rotation of the paddle assembly gathers birds 22 into this space through the open base of the pyramid. Due to the relatively steep angles at the apex of the pyramid, birds 22 can be packed tightly as the paddle assembly rotates. Excessive pressure at the apex of the pyramid can damage birds even to the extent of breaking bones. This problem is especially severe with relatively small birds that are more delicate and that pack into the pocket in large numbers.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, an unloader paddle for use with a poultry processing device, such as a post chill decontamination tank or an auger type, rocker type or other type of poultry chiller, includes an elongated arm having opposite proximal and distal ends. The elongated arm proximal end is configured to be attached to a rotatable hub, and a blade is secured to the elongated arm distal end. In some embodiments, the elongated arm distal end has an L-shaped configuration with first and second transverse portions, and the blade is secured to both the first and second portions.

The paddle blade includes a face, a first edge portion, a second edge portion, and a third convexly curved edge portion. The face of the blade may include a plurality of holes formed therethrough that facilitate movement of the blade through a liquid solution in a tank. The second and third edge portions of the blade extend from the first edge portion and converge to form a tip region, and the tip region is angled or bent in a direction that is transverse to the face of the blade. For example, the tip region may be oriented substantially perpendicular to the face of the blade. The face is substantially planar and the blade is secured to the elongated arm distal end such that the face is oriented transverse to a longitudinal direction of the elongated arm. In some embodiments, the tip region is substantially planar. In some embodiments, the face of the blade has a surface area that is larger than a surface area of the tip region. In some embodiments, the tip region has a surface area that is approximately one to three (1-3) times a cross sectional area of a chicken carcass.

According to some embodiments of the present invention, a poultry processing device includes a tank configured to receive poultry carcasses, and a blade assembly rotatably mounted in the tank. The tank includes an upright entrance wall, an upright exit wall opposed to the entrance wall, and a curved perimeter wall extending between the entrance wall and the exit wall that defines a chamber configured to contain a solution. The tank includes an upwardly positioned opening.

The paddle assembly is rotatably mounted in the chamber about a central axis, and includes a plurality of unloader paddles positioned at different angles about the central axis. Each unloader paddle includes an elongated arm having opposite proximal and distal ends. The elongated arm proximal end is configured to be attached to a rotatable hub and a blade is secured to the elongated arm distal end. Each paddle blade includes a face, a first edge portion, a second edge portion, and a third convexly curved edge portion. The face of each blade includes a plurality of slots formed therethrough that facilitate movement of the blade through a liquid solution in the tank. The second and third edge portions of the blade extend from the first edge portion and converge to form a tip region, and the tip region is angled or bent in a direction that is transverse to the face of the blade. The face of each blade is sloped relative to the tank exit wall and is configured to gather poultry carcasses against the exit wall and lift the poultry carcasses through the solution and out of the tank via the upwardly positioned opening as the paddle assembly rotates in the tank. The second edge of each paddle blade is oriented to become substantially horizontal when the unloader paddle moves upwardly past the upwardly positioned opening of the tank and this horizontal orientation facilitates urging the poultry carcasses out of the tank.

In some embodiments, the tip region of each paddle blade may be oriented substantially perpendicular to the face of the blade. In some embodiments, the face of the blade has a surface area that is larger than a surface area of the tip region. In some embodiments, the tip region has a surface area that is approximately one to three (1-3) times a cross sectional area of a chicken carcass.

According to other embodiments of the present invention, an unloading device includes a tank and a plurality of paddles rotatably mounted within the tank. The tank includes a semi-cylindrical side wall and an exit end wall, and the exit end wall has an upwardly positioned opening for discharging product from the tank. In some embodiments, the exit end wall is substantially normal to a cylindrical axis defined by the semi-cylindrical side wall. The cylindrical axis may be substantially horizontal or may be tilted upwardly away from the exit end wall.

The paddles rotate about a central axis, and each paddle includes a blade having a face disposed at an angle to the exit end wall and a tip region extending from the face at an angle such that the tip region faces substantially normal to a direction of rotation of the paddles. Each paddle includes an elongated arm having opposite proximal and distal ends. A respective blade is secured to each elongated arm distal end, and the elongated arm proximal end is secured to a rotatable hub.

Each respective face and tip region includes a lifting edge closely spaced to the exit end wall and a wiping edge closely spaced to the side wall. Each paddle is configured such that, when a respective face is rotated to a position adjacent the upwardly positioned opening, the face slopes downwardly toward the exit end wall.

In some embodiments, the central axis is substantially coincident with a cylindrical axis defined by the semi-cylindrical side wall.

In some embodiments, each paddle face and/or tip region includes a plurality of holes formed therethrough.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate some exemplary embodiments. The drawings and description together serve to fully explain the exemplary embodiments.

DETAILED DESCRIPTION

Figure 1:
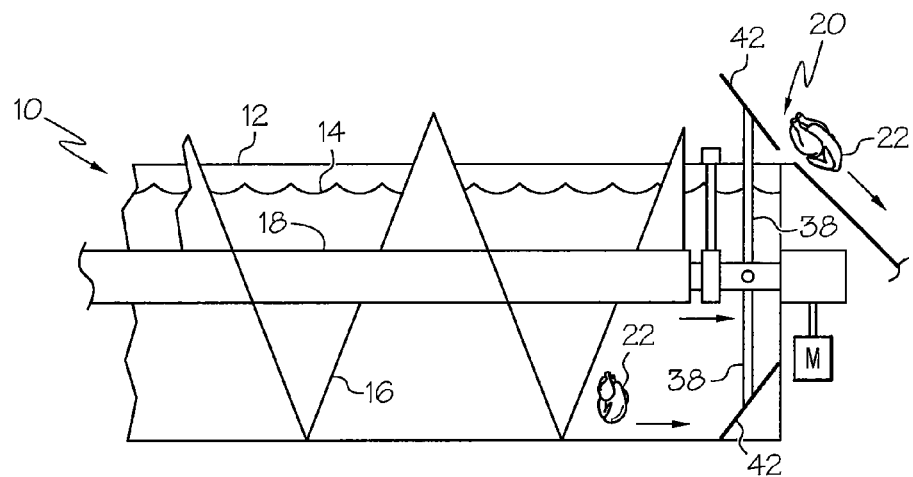
FIG. 1 is a partial side cross-sectional view of a conventional poultry chiller.
Figure 2:
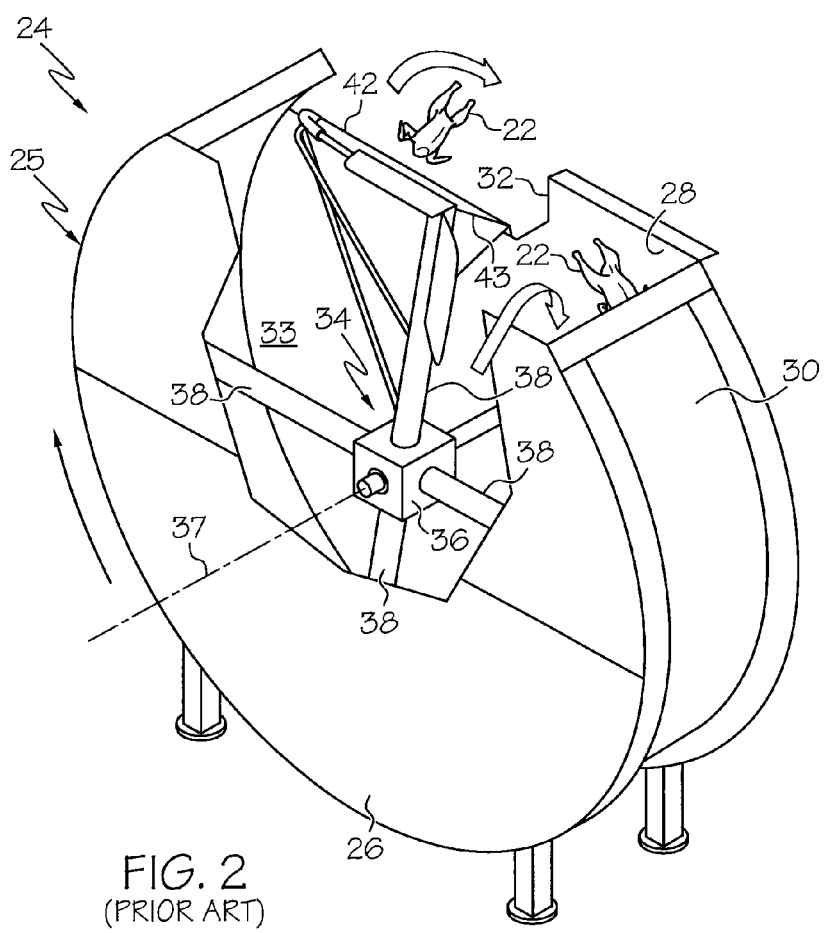
FIG. 2 is a perspective view of a conventional post chill decontamination tank.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the terms "comprise", "comprising", "comprises", "include", "including", "includes", "have", "has", "having", or variants thereof, are open-ended, and include one or more stated features, elements, steps, components or functions but does not preclude the presence or addition of one or more other features, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

The term "about", as used herein with respect to a value or number, means that the value or number can vary more or less, for example by +/−20%, +/−10%, +/−5%, +/−1%, +/−0.5%, +/−0.1%, etc.

The terms "carcass" and "carcasses", as used herein, refer to dressed whole birds (e.g., chickens, turkeys, etc.) and edible parts thereof.

Figure 3:
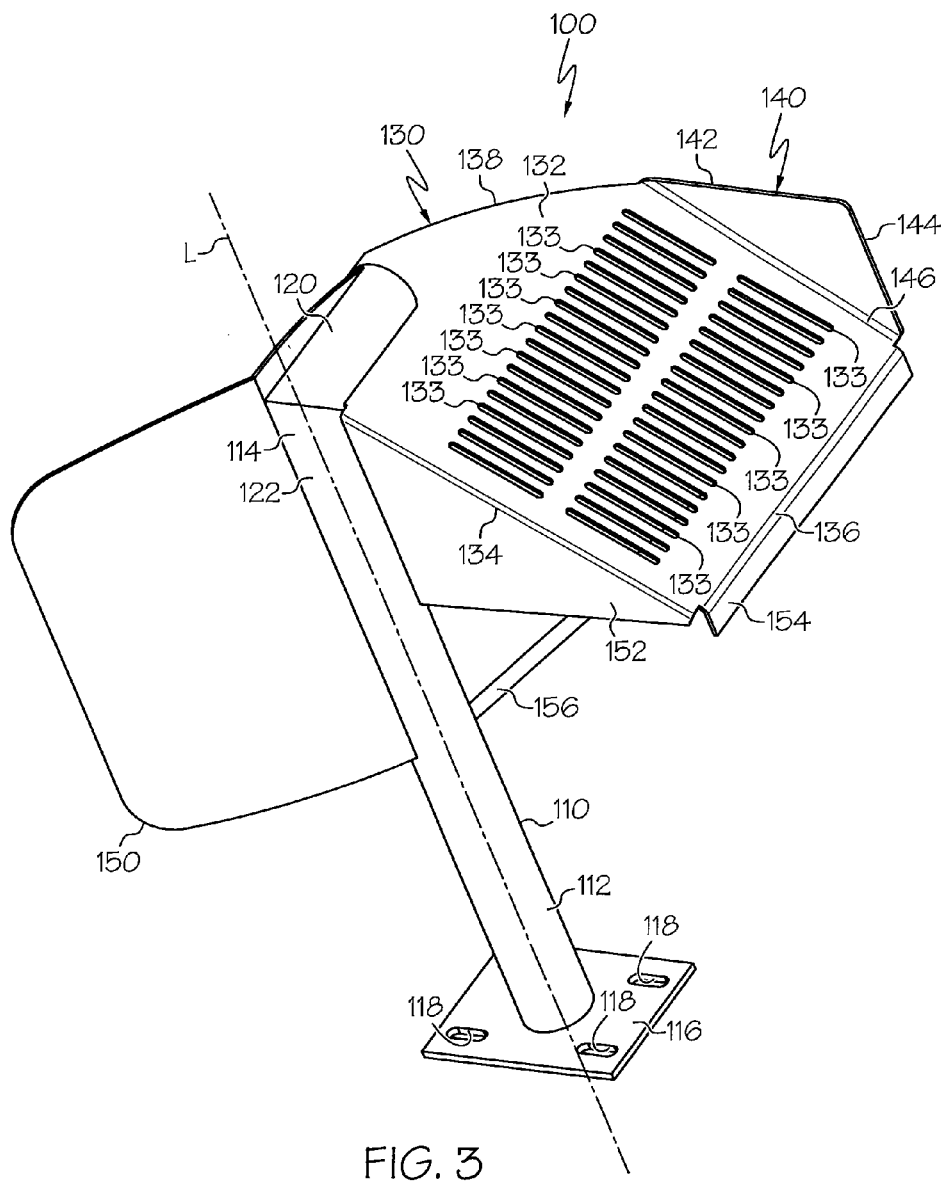
FIG. 3 is a top perspective view of an unloader paddle configured to be rotated in a first direction, according to some embodiments of the present invention.
Figure 4:
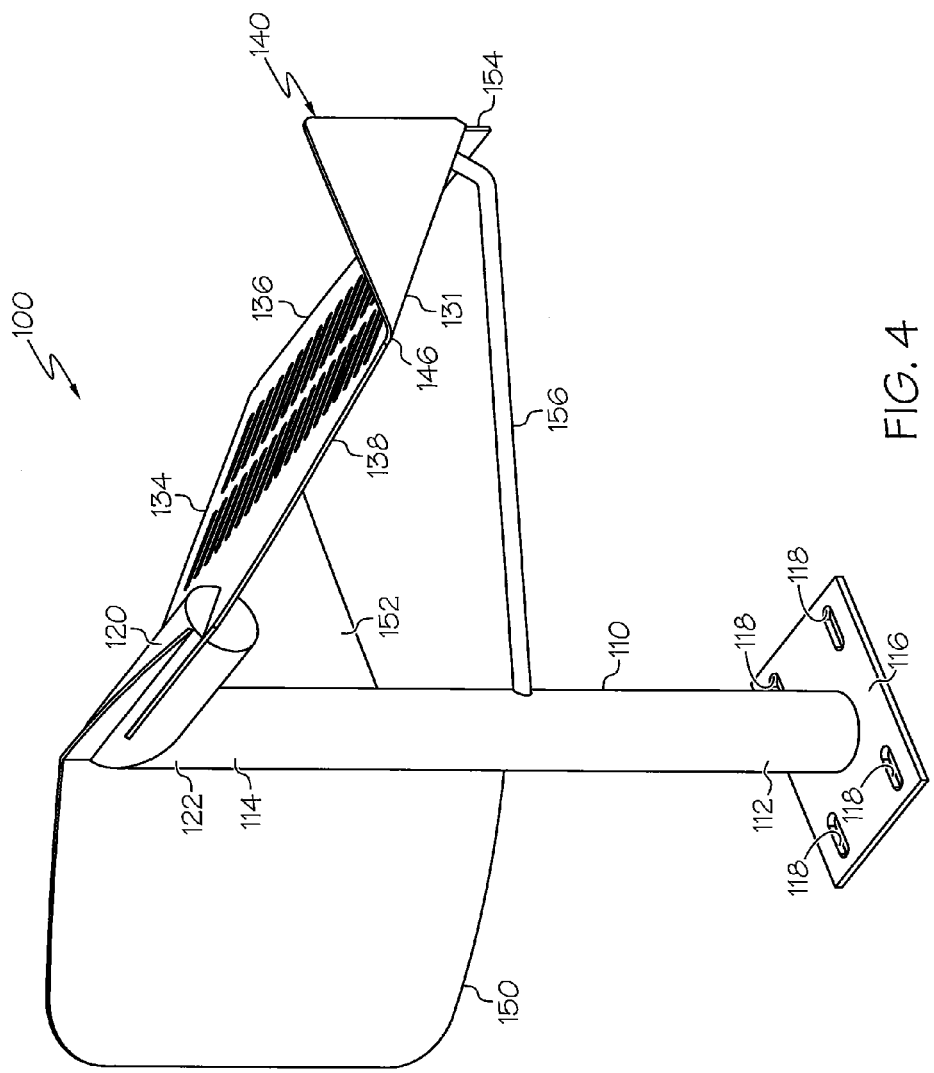
FIG. 4 is a top perspective view of an unloader paddle configured to be rotated in an opposite second direction, according to some embodiments of the present invention.
Figure 5:
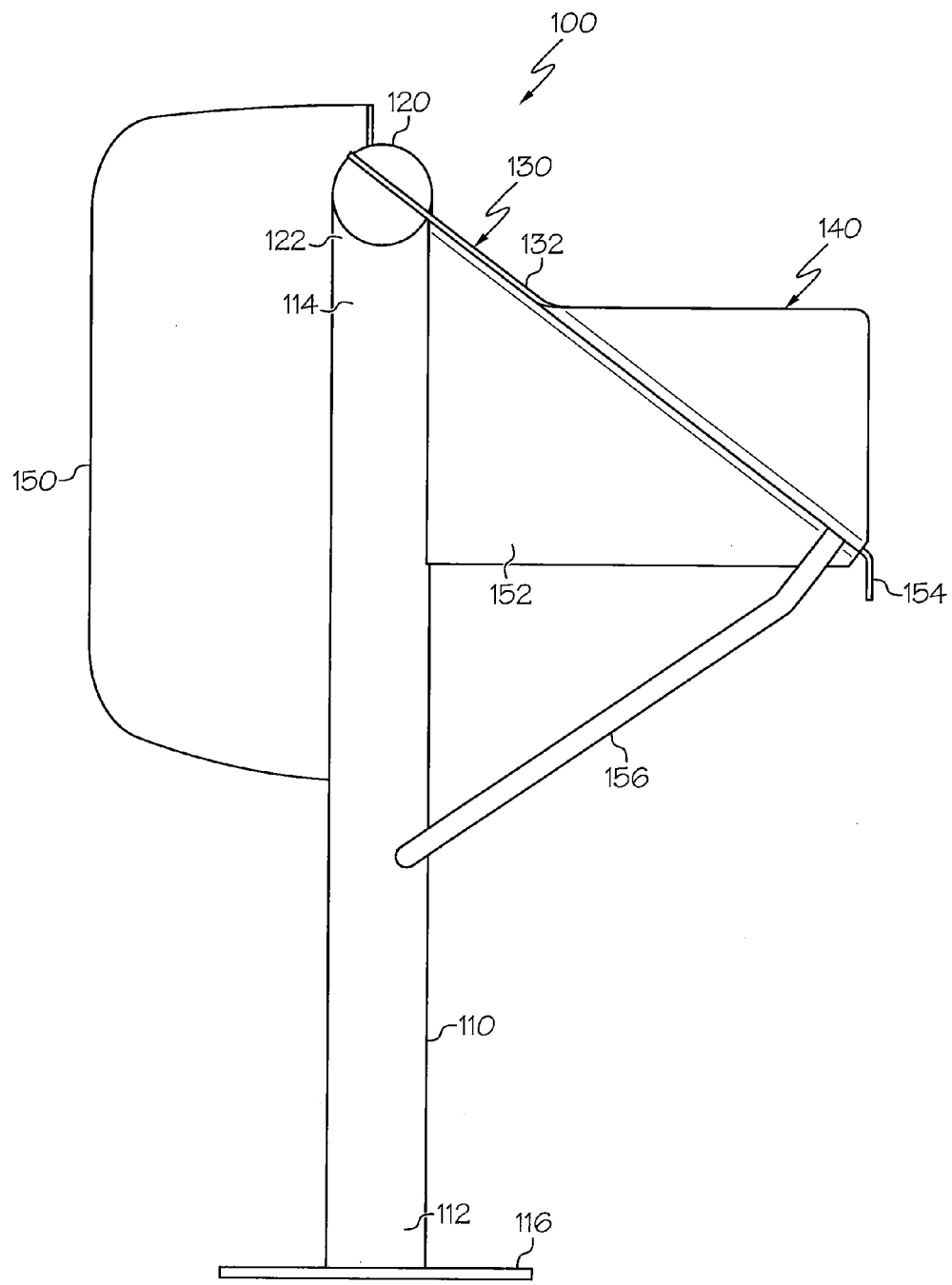
FIG. 5 is a side elevation view of the unloader paddle of FIG. 4.
Figure 6:
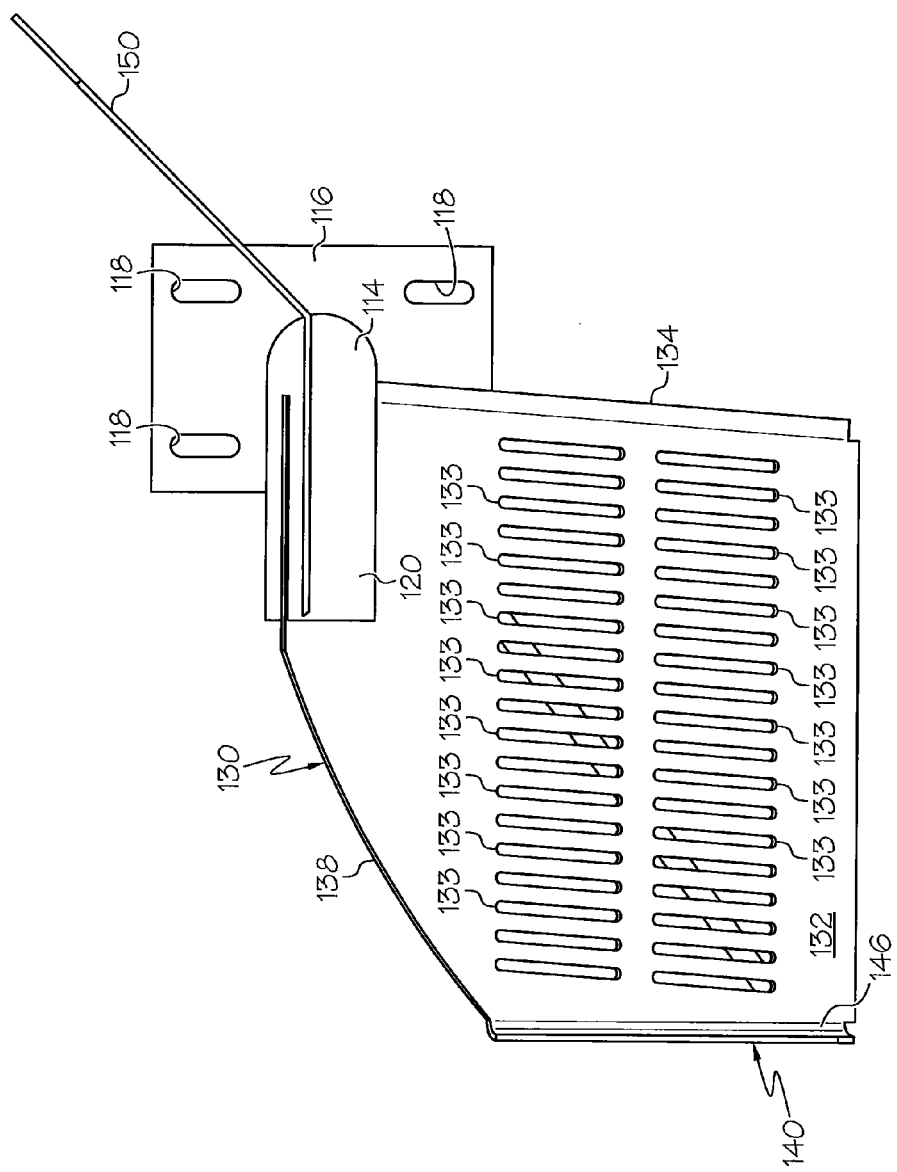
FIG. 6 is a top plan view of the unloader paddle of FIG. 5.
Figure 7:
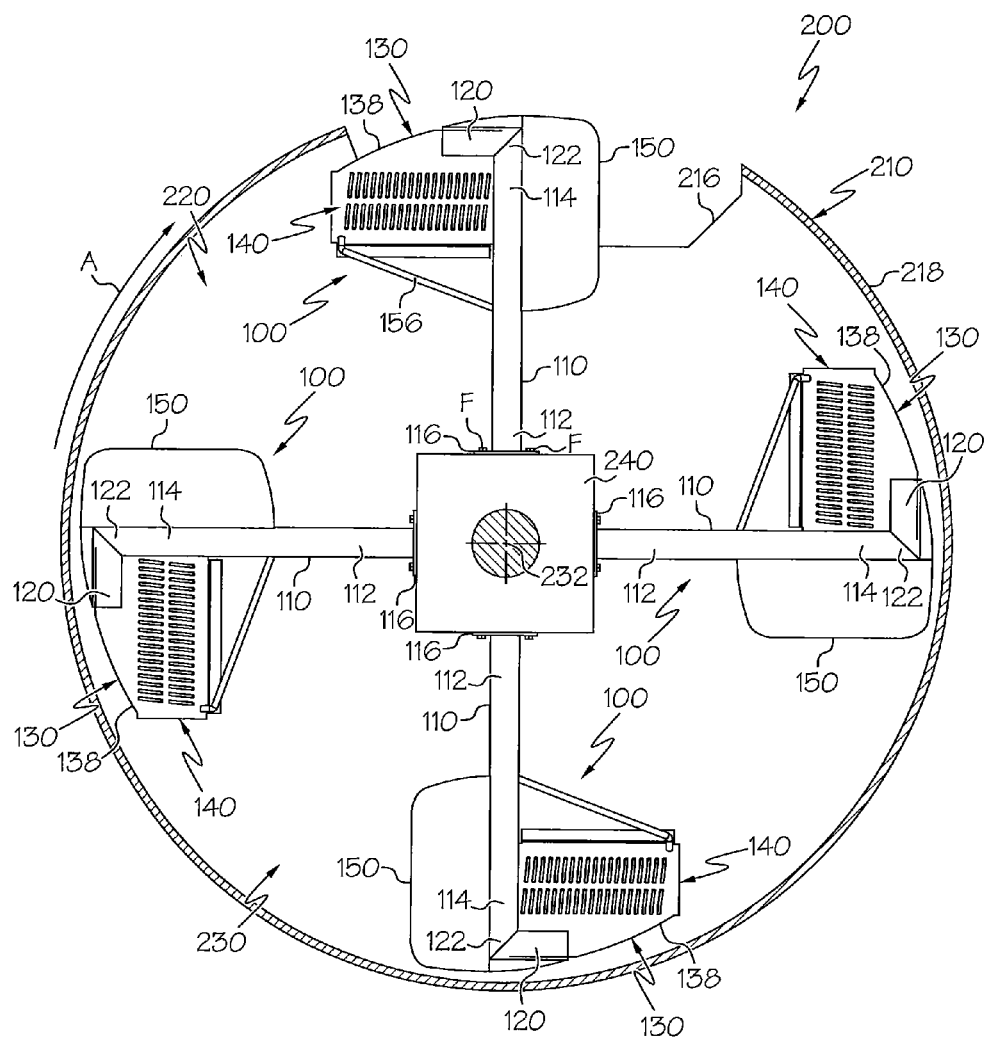
FIG. 7 is a cross-sectional view of a poultry processing device fitted with a plurality of the unloader paddles of FIGS. 3-6, according to some embodiments of the present invention.

Referring now to FIGS. 3-6, an unloader paddle 100 for a poultry processing device, such as a post chill decontamination tank, according to some embodiments of the present invention, is illustrated. In FIG. 3, the illustrated unloader paddle 100 is configured to be rotated in a first direction, for example, a clockwise rotation about a central axis 232 as shown in FIG. 7. FIG. 4 illustrates an unloader paddle 100 configured to be rotated in an opposite second direction, for example, a counterclockwise direction. The unloader paddles 100 illustrated in FIGS. 3 and 4 are mirror images of each other and are identical except for the direction in which they are configured to rotate.

The unloader paddle 100 of FIGS. 3-6 includes an elongated arm 110 that has opposite proximal and distal ends 112, 114. The proximal end 112 of the arm 110 is configured to be attached to a rotatable hub of a paddle assembly (e.g., hub 240 of paddle assembly 220 in FIGS. 7-8). In the illustrated embodiment, the arm proximal end 112 includes a flange 116 having a plurality of apertures 118 formed therethrough. The flange 116 is configured to be attached to the hub (240, FIGS. 7-8) via fasteners F, such as bolts, extending through the apertures 118 that threadingly engage the hub. Alternatively, threaded studs may extend from the hub 240, through the respective apertures 118, and the flange 116 may be secured thereto via nuts threadingly engaging the threaded studs. However, the proximal end 112 of the arm 110 may have various configurations and may be attached to the hub 240 in various ways including welding, as would be understood by one skilled in the art.

The distal end 114 of the illustrated arm 110 has an L-shaped configuration with a first radial portion 120 and a second portion 122 transverse to the first portion 120. However, the distal end 114 of the arm 110 may have various configurations and is not limited to the illustrated L-shaped configuration.

The illustrated unloader paddle 100 includes a blade 130 secured to the elongated arm distal end 114. In the illustrated embodiment, the blade 130 is secured to the first and second portions 120, 122 of the L-shaped arm distal end. In the illustrated embodiment, the blade 130 is welded to the arm. However, the blade 130 may be secured to the arm distal end 114 in various ways, for example, via fasteners, or a via a combination of welding and fasteners, as would be understood by those skilled in the art. Embodiments of the present invention are not limited to the illustrated way in which the blade 130 is secured to the arm distal end 114.

Figure 8:
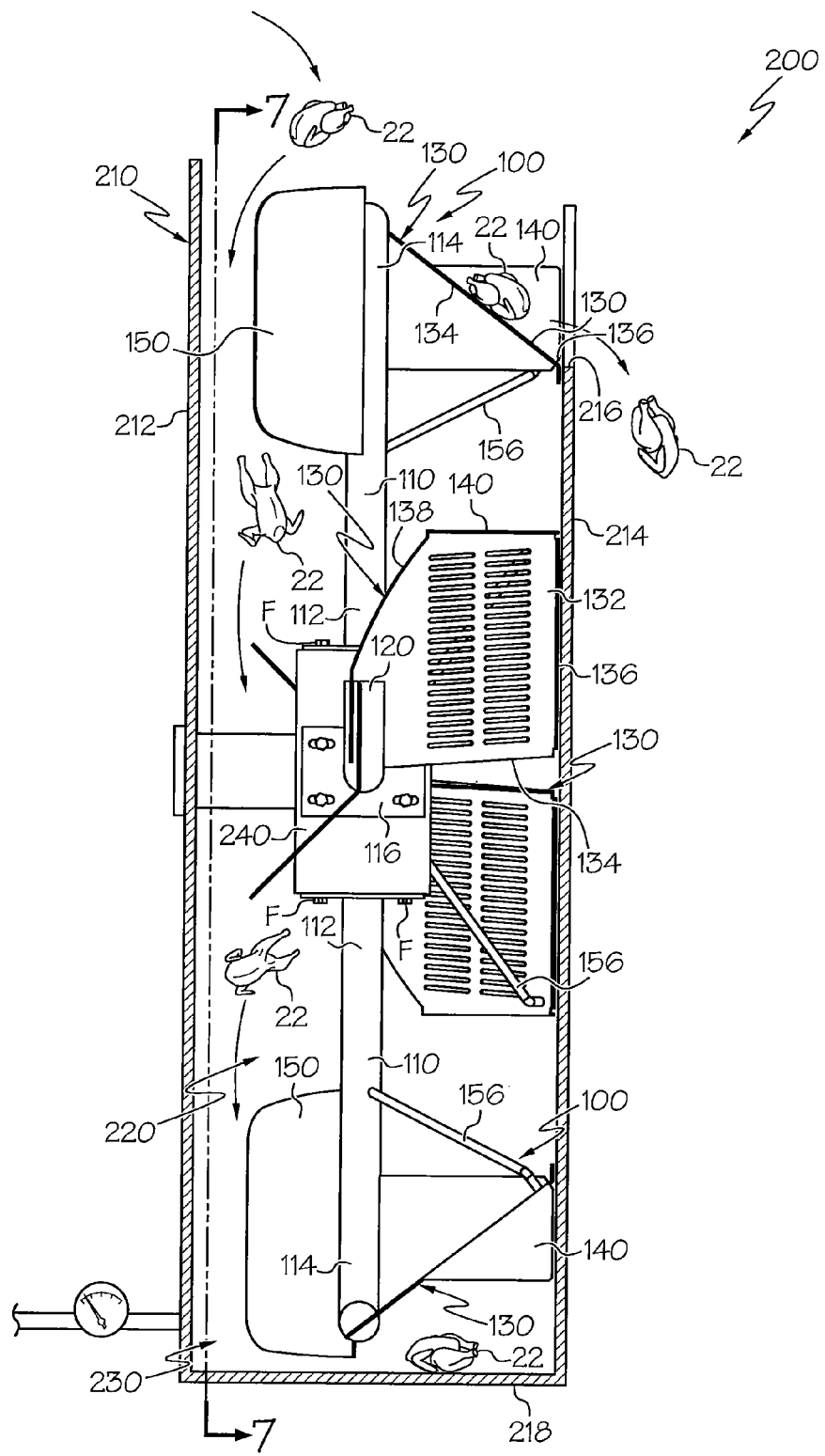
FIG. 8 is a side cross-sectional view of the poultry processing device of FIG. 7.

The blade 130 includes a face 132, a first edge portion 134 (also referred to as a gathering edge), a second edge portion 136 (also referred to as a lifting edge), and a convexly curved third edge portion 138 (also referred to as a wiping edge). As illustrated in FIGS. 7-8, each paddle 100 is configured such that the blade face 132 is oriented towards the tank exit wall 214 (i.e., the face 132 is on the side more nearly facing the exit wall 214). The second and third edge portions 136, 138 extend from the first edge portion 134 and converge to form a tip region 140. As illustrated, the tip region 140 is angled (i.e., bent) in a direction transverse to the face 132 so as to have a generally triangular shape. However, the tip region 140 may have other shapes that substantially close off the apex of the frustum (i.e., the volume) bounded by the paddle, side wall and end wall of the tank. For example, tip region 140 may have a trapezoidal shape. In the illustrated embodiment, a transition portion 146 is provided between the tip region 140 and the face 132 of the paddle blade 130 that smoothly blends the face 132 into the tip region 140.

The illustrated tip region 140 has a wiping edge 142 and a lifting edge 144. As described below with respect to FIGS. 7-8, the wiping edge 142 is configured to be closely spaced to the side wall 218 of tank 210 and the lifting edge 144 is configured to be closely spaced to the tank exit wall 214. The blade face 132 has a surface area that is larger than a surface area of the tip region 140. In some embodiments of the present invention, the tip region 140 has a surface area that is approximately one to three (1-3) times a cross sectional area of a chicken carcass. In some embodiments, the area of the tip region 140 may be 5% to 70% of the surface area of the face 132. In some embodiments, the tip region 140 may extend approximately four to ten inches (4"-10") from the face 132 of the blade 130. The tip region 140 may have holes therethrough that allow the passage of liquid in the tank as the paddle 100 rotates.

In other embodiments, the tip region 140 may be a separate member attached to the blade 130, for example via welding, fasteners, or a combination of welding and fasteners. In other embodiments, the tip region 140 may be supported in proximity to the blade 130 by attachment to the elongated arm 110 without being directly attached to the blade 130. In some embodiments, the tip region 140 may be configured to be replaceable. As such, tip regions of various sizes and/or configurations could be utilized to facilitate the processing of poultry of different sizes.

In the illustrated embodiment, the blade face 132 is substantially planar, and the blade 130 is secured to the elongated arm distal end 114 such that the face 132 is oriented transverse to a longitudinal direction L of the elongated arm 110. In other words, the face 132 is sloped relative to the longitudinal direction L of the elongated arm 110. In other embodiments, the blade 130 may have a non-planar form. For example, the blade 130 may be concave.

In the illustrated embodiment, the tip region 140 is substantially planar and is oriented substantially perpendicular to the face 132. However, the tip region 140 may have various configurations and need not be planar. Moreover, the tip region 140 can have various angles relative to the face 132 and need not be oriented exactly perpendicular to the face 132. In some embodiments, the tip region 140 is oriented substantially perpendicular to the direction of rotation A (FIG. 7) of the paddles 100.

The face 132 of the blade 130 includes a plurality of holes or slots 133 formed therethrough in adjacent, spaced apart arrangement, as illustrated. These holes 133 facilitate rotation of the blade 130 through a liquid solution in a tank (e.g., tank 210, FIGS. 7-8). The holes 133 are illustrated as being elongated, but other shapes may be used as well. For example, the holes 133 may have the shape of a keyhole, etc.

The illustrated unloader paddle 100 of FIGS. 3-6 also includes a fin 150 secured to the elongated arm 110. The fin 150 is configured to facilitate the gathering of birds (22, FIGS. 7-8) onto the face 132 of the blade 130 as the unloader paddle 100 rotates within the tank (210, FIGS. 7-8). In addition, the illustrated unloader paddle 100 of FIGS. 3-6 also includes various structural reinforcing elements 152, 154 that provide strength and stability to the blade 130. For example, a structural member 152 is secured to the first edge portion 134 of the blade 130 and to the elongated arm 110. In addition, a structural member 154 is secured to the second edge 136 of the blade 130. In addition, a support bar 156 is secured to a bottom surface 131 of the blade 130 and to the elongated arm 110 to provide additional rigidity and support to the unloader paddle 100. However, unloader paddles 100, according to embodiments of the present invention may have various structural reinforcing elements and are not limited to the illustrated structural members 152, 154, 156 and/or their configuration.

Referring now to FIGS. 7-8, a poultry processing device 200, according to some embodiments of the present invention, is illustrated. The illustrated device 200 is a post chill decontamination tank assembly for poultry processing, and includes a tank 210 configured to receive poultry carcasses and a paddle assembly 220 rotatably mounted within the tank 210. The tank 210 includes an upright entrance wall 212, an upright exit wall 214 opposed to the entrance wall 212, and a curved perimeter wall 218 extending between the entrance wall 212 and the exit wall 214 that defines a chamber 230. The tank chamber 230 is configured to contain a solution, such as a decontamination solution. An upwardly positioned exit opening 216 is located in the upper portion of the exit wall 214, as illustrated.

The paddle assembly 220 is rotatably mounted in the chamber about a central axis 232 and includes a plurality of unloader paddles 100 secured to a rotatable hub 240. A drive motor (not shown) is configured to be connected to the rotatable hub 240 and to cause the paddle assembly 220 to rotate in the direction of arrow A. In the illustrated embodiment, four unloader paddles 100 are arranged at 90° intervals about the central axis 232. However, other numbers and spacing of the unloader paddles 100 may be utilized.

Each unloader paddle 100 includes an elongated arm 110 and a blade 130 secured to a distal end 114 of the elongated arm 110, as described and illustrated in FIGS. 3-6. Each blade 130 includes a face 132, a first edge portion 134, a second edge portion 136, and a third convexly curved edge portion 138. As described above, the second and third edge portions 136, 138 of each blade 130 extend from the first edge portion 134 and converge to form a tip region 140. The tip region 140 of each blade 130 is angled in a direction transverse to the face 132 of a respective blade 130.

As illustrated in FIG. 8, the face 132 of each blade 130 is sloped relative to the tank exit wall 214. The second or lifting edge 136 of each blade 130 remains in close proximity to the exit wall 214 of the tank 210 as the paddle assembly 220 rotates. The third or wiping edge 138 of each blade 130 has curvature configured to maintain close spacing from the curved side wall 218 of the tank 210. The first or gathering edge 134 opens to the interior of the tank 210 where the poultry carcasses 22 can enter the space or pocket defined by the blade 130 and tank walls 212, 214. As such, each blade 130 is configured to gather poultry carcasses 22 against the exit wall 214 and lift the poultry carcasses 22 through a solution in the tank 210 and out of the tank 210 via the upwardly positioned exit opening 216 as the paddle assembly 220 rotates in the tank 210. As illustrated in FIG. 8, the second edge 136 of each blade 130 is oriented to become substantially horizontal when the unloader paddle 100 moves upwardly past the upwardly positioned exit opening of the tank 216 to facilitate urging the poultry carcasses 22 out of the tank 210.

In some embodiments, an angle between the face 132 of each blade 130 and the exit end wall 214 at the lifting edge 136 may be an acute angle (i.e., an angle less than 90° or preferably less than 60°). In some embodiments, an angle between the face 132 of each blade and the tank side wall 218 at the wiping edge 138 may be an acute angle. In some embodiments, an angle between the tip region 140 of each blade and the side wall 218 at the wiping edge 142 may be an obtuse angle (i.e., an angle greater than 90° and less than 180°).

The transverse tip region 140 of each blade 130 truncates the lifting space between each blade and the exit and side walls 214, 218 of the tank 210 to form a frustum. The tip region 140 has a wiping edge 142 that is closely spaced to the side wall 218 of the tank 210 (FIGS. 7-8) and a lifting edge 144 that is closely spaced to the tank exit wall 214. In some embodiments, the transition portion 146 (FIG. 3) between the tip region 140 and the face 132 of each blade 130 may begin at a location on the second (lifting) edge 136 of each blade 130 that is between about four and sixteen inches (4"-16") from the curved wall 218 of the tank 210.

The tip region 140 of each blade 130 provides a surface that applies pressure to the carcasses 22 in the lifting space at an angle nearly aligned with the direction of rotation A illustrated in FIG. 7 rather than the oblique angle of conventional blades. For example, the angle between a vector representing the direction of rotation and another vector normal to the tip region may be less than 30°. This configuration reduces excessive pressure placed on poultry carcasses 22 within the tank 210 as the paddle assembly 220 is rotated, thereby reducing damage to the poultry product.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

In particular, embodiments of the present invention may be applied to other types of processing equipment than those cited herein. Furthermore, embodiments of the present invention may be used with products other than poultry carcasses. For instance, embodiments of the present invention could be used to unload packages of ground beef from a chilling liquid. Furthermore, embodiments of the present invention can be used with tanks and vessels of various shapes and configurations, including vessels and tanks with non vertical end walls.

That which is claimed is:

1. An unloader paddle, comprising:
an elongated arm having opposite proximal and distal ends; and
a blade secured to the elongated arm distal end, the blade comprising a face, a first edge portion, a second edge portion, and a convexly curved third edge portion, wherein the second and third edge portions extend from the first edge portion and converge to form a tip region, and wherein the tip region is angled in a direction transverse to the face.

2. The unloader paddle of claim 1, wherein the face is substantially planar, and wherein the blade is secured to the elongated arm distal end such that the face is oriented transverse to a longitudinal direction of the elongated arm.

3. The unloader paddle of claim 1, wherein the tip region is substantially planar.

4. The unloader paddle of claim 1, wherein the tip region is substantially planar and is oriented substantially perpendicular to the face.

5. The unloader paddle of claim 1, wherein the face is substantially planar, wherein the tip region is substantially planar, and further comprising a transition portion that smoothly blends the face into the tip region.

6. The unloader paddle of claim 1, wherein the face comprises a plurality of holes formed therethrough.

7. The unloader paddle of claim 1, wherein the elongated arm proximal end is configured to be attached to a rotatable hub.

8. The unloader paddle of claim 1, wherein the elongated arm distal end has an L-shaped configuration with first and second transverse portions, and wherein the blade is secured to the first and second portions.

9. The unloader paddle of claim 1, wherein the face has a first surface area, wherein the tip region has a second surface area, and wherein the first surface area is larger than the second surface area.

10. An unloader paddle, comprising:
an elongated arm having opposite proximal and distal ends; and
a blade secured to the elongated arm distal end, the blade comprising a substantially planar face, a first edge portion, a second edge portion, and a convexly curved third edge portion, wherein the second and third edge portions extend from the first edge portion and converge to form a tip region, wherein the blade is secured to the elongated arm distal end such that the face is oriented transverse to a longitudinal direction of the elongated arm, and wherein the tip region is angled substantially perpendicular to the face.

11. The unloader paddle of claim 10, further comprising a transition portion that smoothly blends the face into the tip region.

12. The unloader paddle of claim 10, wherein the face comprises a plurality of holes formed therethrough.

13. The unloader paddle of claim 10, wherein the elongated arm proximal end is configured to be attached to a rotatable hub.

14. The unloader paddle of claim 10, wherein the elongated arm distal end is L-shaped with first and second transverse portions, and wherein the blade is secured to the first and second portions.

15. The unloader paddle of claim 10, wherein face has a first surface area, wherein the tip region has a second surface area, and wherein the first surface area is larger than the second surface area.

16. A poultry processing device, comprising:
a tank configured to receive poultry carcasses, the tank comprising an upright exit wall and a curved perimeter wall that defines a chamber configured to contain a solution, and wherein the tank comprises an upwardly positioned opening;
a paddle assembly rotatably mounted in the chamber about a central axis, wherein the paddle assembly comprises a plurality of unloader paddles positioned at different angles about the central axis, wherein each unloader paddle comprises:
an elongated arm; and
a blade secured to a distal end of the elongated arm, the blade comprising a face, a first edge portion, a second edge portion, and a convexly curved third edge portion, wherein the second and third edge portions extend from the first edge portion and converge to form a tip region, wherein the tip region is angled in a direction transverse to the face, and wherein the face is sloped relative to the tank exit wall and configured to gather poultry carcasses against the exit wall and lift the poultry carcasses through the solution and out of the tank via the upwardly positioned opening as the paddle assembly rotates in the tank.

17. The poultry processing device of claim 16, wherein the face is substantially planar, and wherein the blade is secured to the elongated arm distal end such that the face is oriented transverse to a longitudinal direction of the elongated arm.

18. The poultry processing device of claim 16, wherein the tip region is substantially planar and is oriented substantially perpendicular to the face.

19. The poultry processing device of claim 16, wherein the face has a first surface area, wherein the tip region has a second surface area, and wherein the first surface area is larger than the second surface area.

20. The poultry processing device of claim 16, wherein the second edge is oriented to become substantially horizontal when the unloader paddle moves upwardly past the upwardly positioned opening of the tank to facilitate urging the poultry carcasses out of the tank.

21. An unloading device, comprising:
a tank, comprising a semi-cylindrical side wall and an exit end wall, wherein the exit end wall comprises an upwardly positioned opening for discharging product from the tank; and
a plurality of paddles rotatably mounted within the tank, wherein the paddles rotate about a central axis, and wherein each paddle comprises a blade having a face disposed at an angle to the exit end wall and a tip region extending from the face at an angle such that the tip region extends substantially normal to a direction of rotation of the paddles.

22. The unloading device of claim 21, wherein each respective face and tip region comprises a lifting edge closely spaced to the exit end wall and a wiping edge closely spaced to the side wall.

23. The unloading device of claim 21, wherein the exit end wall is substantially normal to a cylindrical axis defined by the semi-cylindrical side wall.

24. The unloading device of claim 21, wherein the central axis is substantially coincident with a cylindrical axis defined by the semi-cylindrical side wall.

25. The unloading device of claim 21, wherein each paddle is configured such that, when a respective face is rotated to a position adjacent the upwardly positioned opening, the face slopes downwardly toward the exit end wall.

26. The unloading device of claim 21, wherein each paddle face and/or tip region comprises a plurality of holes formed therethrough.

27. The unloading device of claim 21, wherein each paddle comprises an elongated arm having opposite proximal and distal ends, wherein a respective blade is secured to the elongated arm distal end, and wherein the elongated arm proximal end is secured to a rotatable hub.

28. An unloading device, comprising:
a tank, comprising a semi-cylindrical side wall and an exit end wall substantially normal to a cylindrical axis defined by the semi-cylindrical side wall, wherein the exit end wall comprises an upwardly positioned opening for discharging product from the tank; and
a plurality of paddles rotatably mounted within the tank, wherein the paddles rotate about a central axis, and wherein each paddle comprises a blade having a face and a tip region extending from the face at an angle such that the tip region extends substantially normal to a direction of rotation of the paddles;
wherein each paddle further comprises an elongated arm having opposite proximal and distal ends, wherein a respective blade is secured to the elongated arm distal end, and wherein the elongated arm proximal end is secured to a rotatable hub;
wherein each face is disposed at an angle to the exit end wall such that, when a respective face is rotated to a position adjacent the upwardly positioned opening, the face slopes downwardly toward the exit end wall; and
wherein each respective face and tip region comprises a lifting edge closely spaced to the exit end wall and a wiping edge closely spaced to the side wall.

* * * * *